United States Patent [19]

Hitachi et al.

[11] Patent Number: 5,380,501

[45] Date of Patent: Jan. 10, 1995

[54] EXHAUST GAS CLEANING DEVICE

[75] Inventors: Yuzo Hitachi; Haruo Serizawa, both of Shizuoka, Japan

[73] Assignee: Usui Kokusai Sangyo Kabushiki Kaisha, Japan

[21] Appl. No.: 517,878

[22] Filed: May 2, 1990

[30] Foreign Application Priority Data

May 8, 1989 [JP] Japan .................. 1-113838

[51] Int. Cl.6 .................. B01D 50/00; B01D 53/00
[52] U.S. Cl. .................. 422/180; 422/177; 422/179; 55/498; 55/499
[58] Field of Search .......... 422/177, 179, 180; 55/337, 523, 498, 499

[56] References Cited

U.S. PATENT DOCUMENTS

| | | | |
|---|---|---|---|
| 3,441,381 | 4/1969 | Keith et al. | 422/180 |
| 3,938,959 | 2/1976 | Matsui et al. | 422/179 |
| 3,972,687 | 8/1976 | Frietzsche | 422/180 |
| 4,793,136 | 12/1988 | Whittenberger | 422/211 |
| 4,853,360 | 8/1989 | Hitachi | 502/439 |
| 4,857,413 | 8/1989 | Hashimoto et al. | 502/439 |
| 4,857,500 | 8/1989 | Hitachi et al. | 502/439 |
| 4,948,774 | 8/1990 | Usui et al. | 502/439 |
| 4,988,483 | 1/1991 | Usui et al. | 422/180 |

FOREIGN PATENT DOCUMENTS 1380825 10/1964 France .

*Primary Examiner*—Michael G. Wityshyn
*Assistant Examiner*—T. J. Reardon
*Attorney, Agent, or Firm*—Lowe, Price, LeBlanc & Becker

[57] ABSTRACT

An exhaust gas cleaning device is constructed of a metal casing and a honeycomb core body fixedly inserted in the metal casing. The honeycomb core body have been formed by superposing a planar band made of a metal sheet and a corrugated band made from another metal sheet one over the other in a contiguous relation, defines a number of network-patterned axial gas flow passages, and is adapted to carry an exhaust gas cleaning catalyst thereon. The metal casing defines a cavity compartment isolated from an exterior. Preferably, at least one rib or partition wall is arranged in the cavity compartment of the metal casing.

9 Claims, 4 Drawing Sheets

EXHAUST GAS CLEANING DEVICE

BACKGROUND OF THE INVENTION

1) Field of the Invention

The present invention relates to an exhaust gas cleaning device constructed of a metal casing and a metal-made honeycomb core body for carrying an exhaust gas cleaning catalyst. As a cleaning means for exhaust gas from a motor vehicle, the exhaust gas cleaning device is generally installed at an intermediate point of an exhaust pipe.

More specifically, this invention is concerned with an exhaust gas cleaning device of the above sort, which is employed under severe conditions. The exhaust gas cleaning device features the use of a cylindrical metal casing which defines a cavity compartment isolated from an exterior so as to improve the efficiency of cleaning of exhaust gas by the honeycomb core body.

2) Description of the Related Art

Exhaust gas cleaning devices of the above sort have conventionally been fabricated in the following manner. Namely, a planar band made of a heat-resistant steel sheet and a corrugated band obtained by forming a similar steel sheet into a wavy or sinuous form are superposed one over the other in a contiguous relation and rolled together into a multilayered spiral form or are superposed in layers, thereby forming a honeycomb-shaped multilayered composite body (hereinafter called the "honeycomb core body") axially defining a number of network-patterned gas flow passages for allowing exhaust gas to flow therethrough.

The honeycomb core body fabricated as described above is then inserted into a cylindrical metal casing which are opening in both ends thereof. Incidentally, as the material of the metal casing, a heat-resistant stainless steel sheet whose thickness is 1-2 mm is generally used.

The honeycomb core body and metal casing are thereafter firmly joined together by brazing or welding, so that they can withstand thermal deformation forces due to the high temperature of exhaust gas, exothermic reactions of exhaust gas induced by the catalyst and further vibrations while the associated motor vehicle is running. Needless to say, the planar and corrugated bands which make up the honeycomb core body can be firmly joined together at contacts therebetween by any one of various suitable methods, for example, by brazing or welding.

In an exhaust gas cleaning device of the above sort which is constructed of a metal-made honeycomb core body and a cylindrical metal casing, an outer peripheral wall of the metal casing is in contact with the surrounding air so that the internal heat, namely, the heat of the honeycomb core body is radiated from the metal casing. A substantial temperature difference is therefore developed between the outer peripheral wall of the metal casing and the honeycomb core body inside the metal casing. As a result, thermal deformation forces from the honeycomb core body are concentrated around areas of contact between the inner peripheral wall of the metal casing and an outer peripheral wall of the honeycomb core body. In directions perpendicular to the longitudinal axis of the honeycomb core body (hereinafter called "radial directions of the honeycomb core body"), to say nothing of the axial direction of the honeycomb core body (namely, the direction in which exhaust gas flows in and passes through), deformation forces are produced by thermal expansion and thermal stress occurred in an atmosphere of high temperature due to the elevated temperature of exhaust gas itself and heat generated by a catalytic reaction of unburnt gas. These deformation forces then concentrate in the vicinity of an outer peripheral portion of the honeycomb core body, said outer peripheral portion having a large temperature gradient, or around the areas of contact between the outer peripheral wall of the honeycomb core body and the inner peripheral wall of the associated metal casing by way of the elements (i.e., the planar band and corrugated band) of the honeycomb core body.

In the vicinity of the outer peripheral portion of the honeycomb core body or around the areas of contact between the outer peripheral wall of the honeycomb core body and the inner peripheral wall of the metal casing, the large deformation forces caused by the aforementioned thermal expansion and thermal stress cause cracking and breakage of the planar band and/or corrugated band, which make up the honeycomb core body, and also dropping or separation at the areas of contact between the respective bands and also at the areas of contact between the honeycomb core body and the metal casing.

In addition, cracking and breakage also occur in the outer peripheral wall of the metal casing itself, which is generally 1-2 mm thick as described above. This is not only very dangerous but also leads to a reduction in the service life of the exhaust gas cleaning device.

Corrections are therefore needed to the conventional belief that it is only necessary to establish firm joining or unification between a planar band and an associate corrugated band, which make up the honeycomb body, or between the outer peripheral wall of the honeycomb body and the inner peripheral wall of an associated metal casing.

SUMMARY OF THE INVENTION

With a view toward overcoming the above-described drawbacks of the conventional exhaust gas cleaning devices, the present inventors have conducted an extensive investigation. As a result, it has been found that the formation of a cavity compartment, which is isolated from an exterior, in a metal casing leads to a more uniform temperature distribution inside an associated honeycomb core body and the drawbacks caused by axial and radial thermal expansion and thermal stress concentrating in the vicinity of an outer peripheral portion of the honeycomb core body can therefore be overcome, leading to the completion of the present invention.

In one aspect of the present invention, there is thus provided an exhaust gas cleaning device constructed of a metal casing and a honeycomb core body fixedly inserted in the metal casing, said honeycomb core body having been formed by superposing a planar band made of a metal sheet and a corrugated band made from another metal sheet one over the other in a contiguous relation, defining a number of network-patterned axial gas flow passages and being adapted to carry an exhaust gas cleaning catalyst thereon. The metal casing defines a cavity compartment isolated from an exterior.

Owing to the formation of the cavity compartment in the metal casing, the exhaust gas cleaning device has brought about the following excellent advantageous effects:

Because of the improved heat insulating performance of the metal casing, the temperature distribution inside the honeycomb core body fixedly inserted within the casing becomes more uniform. As a result, the temperature gradient in the vicinity of the outer peripheral portion of the honeycomb core body is reduced, whereby thermally-developed deformation forces concentrating in the outer peripheral portion of the honeycomb core body or around areas of contact between the outer peripheral wall of the honeycomb core body and the inner peripheral wall of the metal casing can be effectively avoided. The exhaust gas cleaning device according to the present invention has higher durability compared to conventional exhaust gas cleaning devices.

DETAILED DESCRIPTION OF THE INVENTION AND PREFERRED EMBODIMENTS

Figure 1:
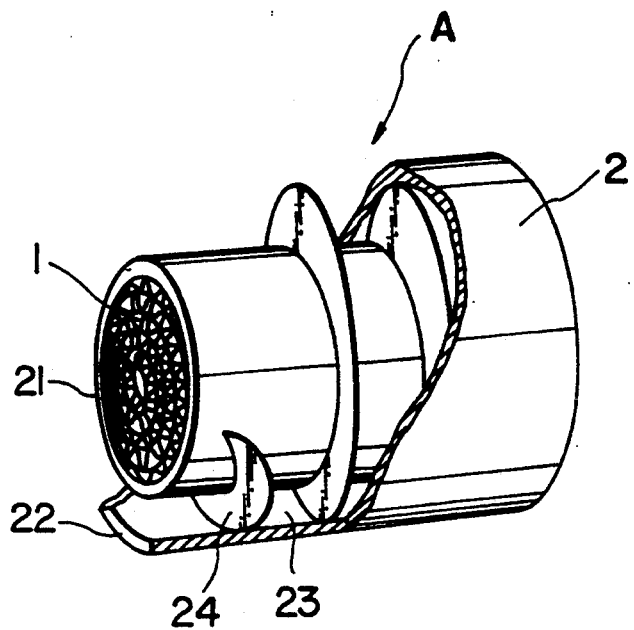
FIG. 1 is a partly cut-off perspective view of an exhaust gas cleaning device according to a first embodiment of the present invention.

Technical features and preferred embodiments of the present invention will hereinafter be described in detail on the basis of the accompanying drawings. It should however be borne in mind that the present invention are not limited to those illustrated in the drawings.

The present invention is generally directed to an exhaust gas cleaning device constructed of a metal-made honeycomb core body for carrying an exhaust gas cleaning catalyst, such as Pt, Pd or Rh, and a cylindrical metal casing. The greatest feature of the present invention resides in the use of a metal casing, which defines a cavity compartment isolated from an interior, as the above metal casing.

Figure 6:
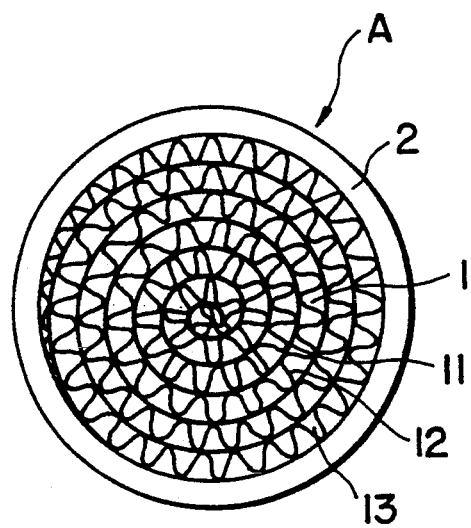
FIG. 6 is a front view of an exhaust gas cleaning device of FIG. 3, in which a rolled honeycomb core body is used.
Figure 7:
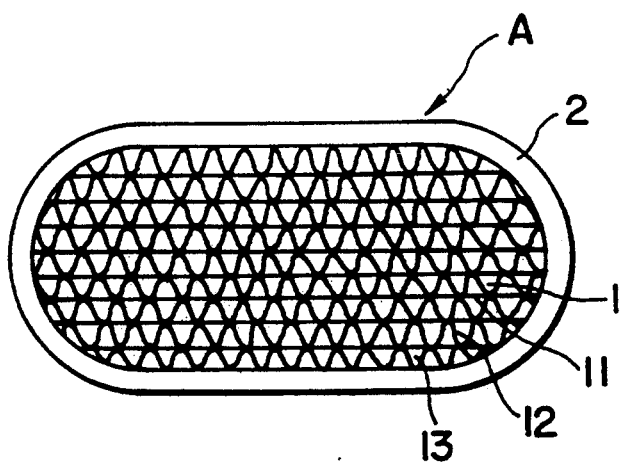
FIG. 7 is a front view of a modification of the exhaust gas cleaning device of FIG. 3, in which a stacked honeycomb core body is employed.

In the present invention, the metal-made honeycomb core body itself is as shown in FIG. 6 or FIG. 7 and can be fabricated in a conventional manner.

As depicted in FIG. 6, a honeycomb core body 1 as a principal element of an exhaust gas cleaning device A is fabricated by superposing a planar band 11 and a corrugated band 12 one over the other in a contiguous relation and then rolling them together into a multilayered spiral form, preferably with the outermost peripheral wall being formed of the planar band 11. The planar band 11 is formed of a heat-resistant steel sheet and has a thickness of about 0.03–0.1 mm, while the corrugated band 12 has been obtained by corrugating a similar steel sheet into a wavy or sinuous form. Needless to say, the outermost peripheral wall can be formed by the corrugated band 12. By the above rolling into the multilayered spiral form, there are automatically formed a number of network-patterned axial gas flow passages 13 which serve as flow passages for exhaust gas. As an alternative, the honeycomb core body 1 can also be fabricated by superposing a planar band 11 and a corrugated band 12 in a contiguous relation and then stacking them in layers as illustrated in FIG. 7.

As the planar band 11, there is used, for example, a sheet having a thickness of 0.04 mm and a width of 100 mm and made of a heat-resistant stainless steel such as Fe-Cr20%-Al5% or a heat-resistant stainless steel formed by adding a rare earth metal, such as Ce or Y, to the former stainless steel to improve the oxidation resistance. As the corrugated band 12, a similar stainless steel sheet is used after its corrugation. Use of an Al-containing stainless steel sheet as each of the bands is preferred because $Al_2O_3$ is formed as whiskers on the surfaces of the band by heat treatment and serves to firmly hold a wash coat adapted to bear an exhaust gas cleaning catalyst.

As shown in FIGS. 6–7, the honeycomb core body 1 is then inserted in the metal casing 2, and they are firmly joined together.

A description will next be made of the structure of the metal casing 2 useful in the practice of the present invention.

Heat-insulating property is imparted to the metal casing 2 in the present invention, so that the temperature distribution inside the honeycomb core 1 arranged within the metal casing 2 is rendered more uniform to effectively reduce the above-mentioned deformation forces concentrating in the vicinity of the outer peripheral portion of the honeycomb core body 1 or around the areas of contact between the outer peripheral wall of the honeycomb core body 1 and the metal casing 2 due to thermal expansion or thermal stress, which may hereinafter be referred to as "deformation forces due to heat").

For the reasons mentioned above, the metal casing 2 in the present invention is constructed to have the cavity compartment 23 isolated from the exterior the present invention so as to impart heat-insulating property to the metal casing 2. Preferably, one or more ribs or partition walls of one of various shapes can be arranged in the cavity compartment, so that the rigidity of the metal casing can be improved to prevent the metal casing 2 from being deformed, cracked or otherwise damaged.

Air can be fed to and discharged from the cavity compartment, which is formed in the metal casing, by an air-feeding and air-discharging means. This embodiment is effective to protect the exhaust gas cleaning device from overheating at the time of starting of an associated internal combustion engine or during operation of the engine.

The cavity compartment formed in the metal casing can be maintained in a depressurized or vacuum state, so that the heat-insulating effect of the metal casing can be improved further and/or noise can be prevented.

Certain specific structures of the metal casing 2 defining the cavity compartment isolated from the exterior will hereinafter be described with reference to the drawings.

Figure 2:
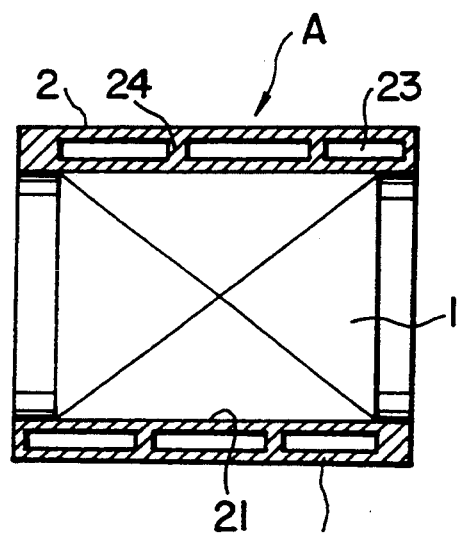
FIG. 2 is a cross-sectional view of the exhaust gas cleaning device of FIG. 1.

(i) Referring to FIGS. 1 and 2, the metal casing 2 of the exhaust gas cleaning device A of the first embodiment defines a cavity compartment 23 between an inner cylinder 21 disposed in contact with the honeycomb core body 1 and an outer cylinder 22 exposed to, namely, maintained in contact with the surrounding air. In addition, to improve the rigidity of the metal casing 2, a spiral rib 24 is disposed within the cavity compartment 23.

Figure 3:
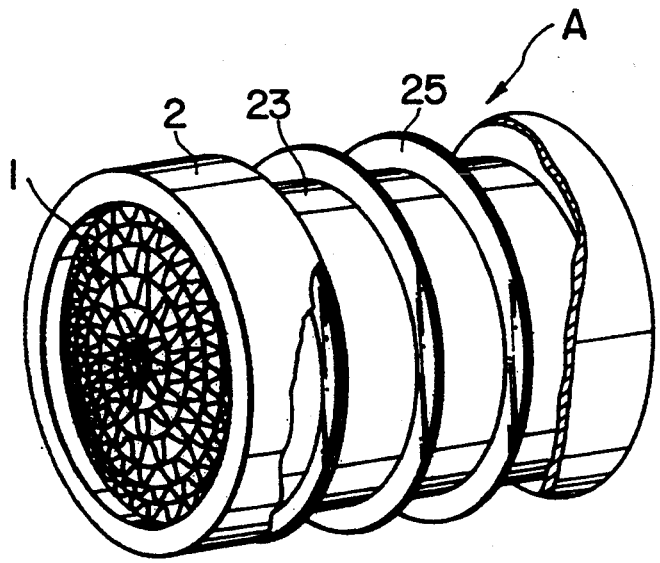
FIG. 3 is a partly cut-off perspective view of an exhaust gas cleaning device according to a second embodiment of the present invention.

(ii) Referring next to FIG. 3, the metal casing 2 of the exhaust gas cleaning device A of the second embodiment defines a cavity compartment 23 and plural ring-shaped ribs 25 are arranged using the cavity compartment 23.

Figure 4:
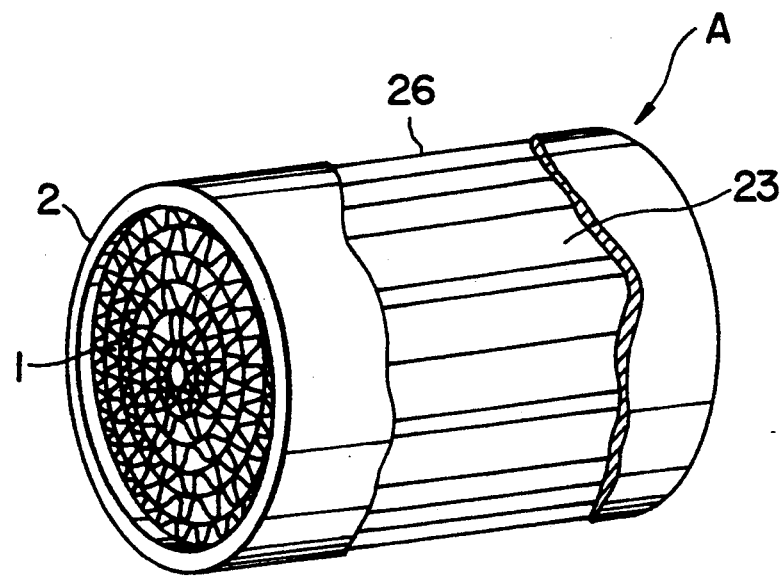
FIG. 4 is a partly cut-off perspective view of an exhaust gas cleaning device according to a third embodiment of the present invention.

(iii) Referring to FIG. 4 which illustrates the exhaust gas cleaning device A of the third embodiment, the metal casing 2 defines a cavity compartment 23 in which there are arranged plural linear partition walls 26 parallel to the axis of the honeycomb core body 1.

Figure 5:
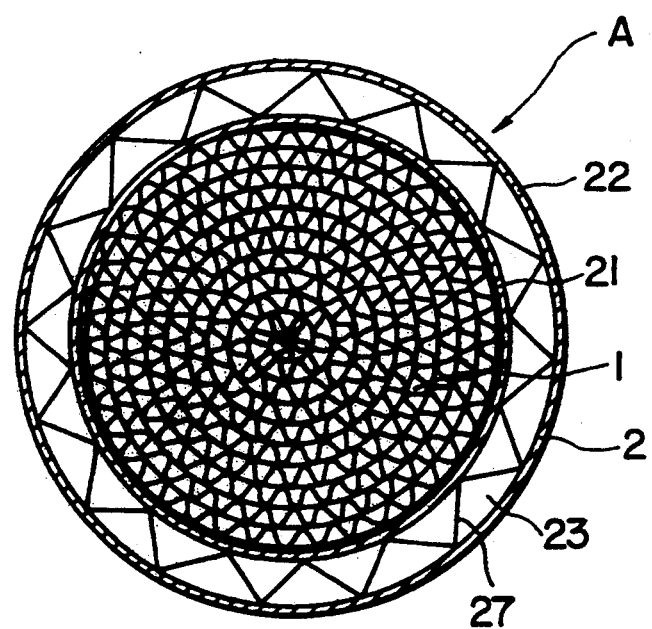
FIG. 5 is a transverse cross-sectional view of an exhaust gas cleaning device according to a fourth embodiment of the present invention.

(iv) Referring to FIG. 5, the metal casing 2 of the exhaust gas cleaning device A of the fourth embodiment defines a cavity compartment 23 in which there is arranged a corrugated plate with alternating plural ridges and grooves. These ridges and grooves extend in parallel with the axis of the honeycomb core body 1 and form partition walls 27 which have a peaked-wave shape.

(v) The metal casing 2 is not limited to the above-described structures in the present invention. The metal casing 2 can also have the following structures.

(a) Two or more of the ribs and partition walls shown in FIGS. 1-5 may be combined as needed, although such structures are not illustrated in the accompanying drawings.

Figure 8:
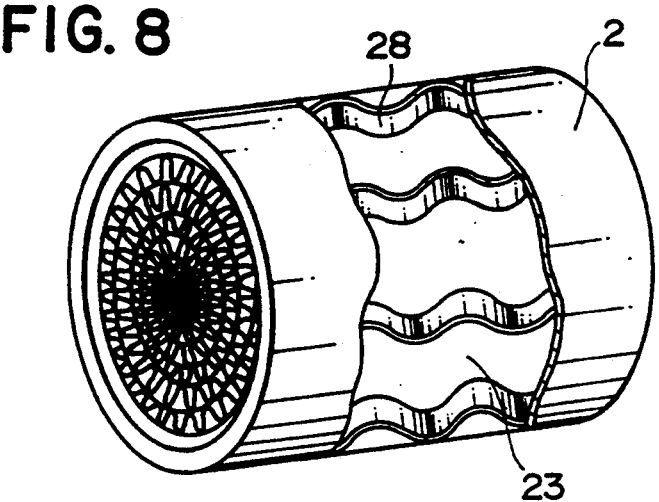
FIG. 8 is a partly cut-off perspective view of an exhaust gas cleaning device according to a fifth embodiment of the present invention.

(b) As a modification of the third embodiment (iii), FIG. 8 illustrates the fifth embodiment of this invention. The linear partition walls 26 of the third embodiment have been replaced by wavy partition walls 28, i.e., curvilinear partition walls 28 extending in parallel to the axis of the honeycomb core body. The metal casing 2 of the fifth embodiment has been improved further.

Figure 9:
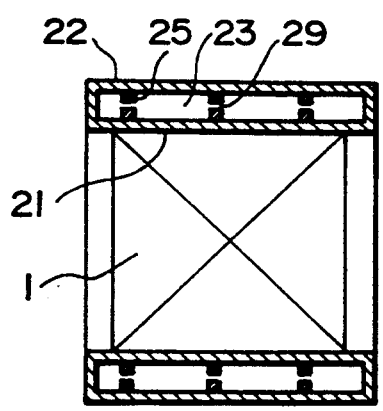
FIG. 9 is a cross-sectional view of an exhaust gas cleaning device according to a sixth embodiment of the present invention.

(c) As illustrated as the sixth embodiment of the present invention in FIG. 9, one or more communication openings 29 of a desired shape, for example, holes or slits are formed through each of the above-described ribs and partition walls of the various shapes, so that spaces divided by the rib or partition are communicated to each other. In this embodiment, air is allowed to circulate through the cavity compartment so that the temperature becomes more uniform.

Figure 10:
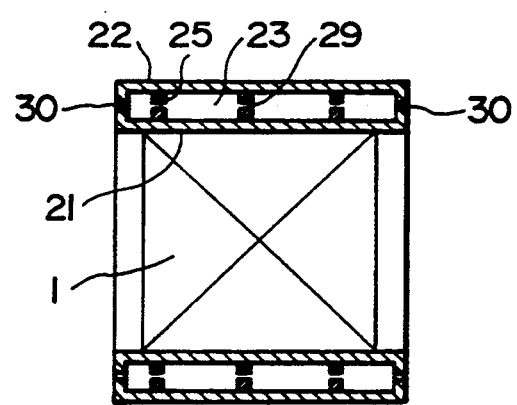
FIG. 10 is a cross-sectional view of an exhaust gas cleaning device according to a seventh embodiment of the present invention.
Figure 11:
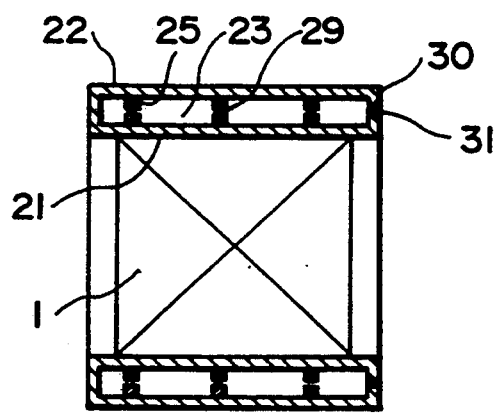
FIG. 11 is a cross-sectional view of an exhaust gas cleaning device according to an eighth embodiment of the present invention.

(d) To make an exhaust gas cleaning device of this sort operate efficiently, it is preferred to heat, in advance, its honeycomb core body which carries an exhaust gas cleaning catalyst thereon. It is therefore possible, for example, to guide high-temperature exhaust gas into the cavity compartment 23 of the metal casing 2 for a short time at the time of starting of an associated motor vehicle, so that the honeycomb core body 1 can be preheated. For this purpose, the metal casing 2 in the exhaust gas cleaning device according to the seventh embodiment shown in FIG. 10 is provided with a means for feeding air into and discharging air from the cavity compartment of the metal casing, for example, with air inlets/outlets 30,30. It is also possible to provide a heating means, for example, one or more -resistance wires in the cavity compartment so that the honeycomb core body may be heated by feeding a current through the resistance wires. To further improve the heat-insulating effect of the metal casing, the cavity compartment 23 may be evacuated to bring it into a depressurized or vacuum state. FIG. 11 shows this as the eighth embodiment. Cavity compartments 23 are brought into a vacuum state by way of communication openings 29 and an air evacuation opening 30. The evacuation opening 30 is then closed by brazing or welding, whereby a plug 31 is formed within the evacuation opening 30 to maintain the cavity compartments in the vacuum state.

In the present invention, no particular limitation is imposed on the manner of arrangement of the rib(s) or partition wall(s) 24, 25, 26 or 27 in the metal casing 2. For example, one or more desired ribs or partition walls can be arranged by fixing them on the outer wall of the inner cylinder 21 or on the inner wall of the outer cylinder 22, said inner and outer cylinder forming the metal casing 2, and then fixing the outer cylinder 22 or the inner cylinder 21 on the ribs or partition walls, thereby fabricating the metal casing 2 defining the cavity compartment 23 isolated from the exterior and having the ribs or partition walls arranged inside the cavity compartment 23. Needless to say, the outer peripheral wall of the honeycomb core body 1 can be used as the inner cylinder 21 which forms the metal casing 2. In this embodiment, it is desirable that the planar band 11 is wound a desired number of times on the outer peripheral wall of the honeycomb core body 1.

In the present invention, no particular limitation is imposed on the shape of the metal casing 2 defining the cavity compartment 23, as long as the metal casing 2 is open at both ends. Metal casings having a circular cross-section and a racetrack-shaped (i.e., oval) cross-section respectively are shown in FIG. 6 and FIG. 7, respectively. The present invention is however not limited to the use of such metal casings. For example, to be fitted in a space underneath a vehicle body, an exhaust gas cleaning device can be constructed using a metal casing of a substantially triangular cross-section.

As the material of the metal casing, it is possible to use the same heat-resistant steel as the honeycomb core body or to employ a metal having high heat and corrosion resistance.

What is claimed is:

1. In an exhaust gas cleaning device constructed of a metal casing and a honeycomb core body fixedly inserted in said metal casing, said honeycomb core body having been formed by superposing a planar band made of a metal sheet and a corrugated band made from another mental sheet one over the other in a contiguous relationship so as to define a plurality of axial gas flow passages and being adapted to carry an exhaust gas cleaning catalyst thereon, the improvement wherein said metal casing includes a closed annular cavity compartment located within an interior portion of said metal casing and at least one rib or partition wall arranged in said closed cavity compartment.

2. The device of claim 1, wherein said at least one rib or partition wall has a shape selected from a spiral shape, a ring shape, a linear shape parallel to an axis of said honeycomb core body, a curvilinear shape parallel to an axis of said honeycomb core body, and a peaked-wave shape extending in an angular direction relative to an axis of said honeycomb core body.

3. The device of claim 1, wherein said at least one rib or partition wall arranged in said closed cavity compartment of said metal casing provides a structure such that spaces defined by said at least one rib or partition wall are interconnected.

4. In an exhaust gas cleaning device constructed of a metal casing and a honeycomb core body fixedly inserted in said metal casing, said honeycomb core body having been formed by superposing a planar band made of a metal sheet and a corrugated band made from another metal sheet one over the other in a contiguous relationship so as to define a plurality of axial gas flow passages and being adapted to carry an exhaust gas cleaning catalyst thereon, the improvement wherein said metal casing includes a closed annular cavity compartment located within an interior portion of said metal casing and said metal casing is provided with a means for feeding air into and discharging air from said closed cavity compartment.

5. The device of claim 1, wherein said closed cavity compartment comprises a sealed cavity.

6. The device of claim 1, wherein said honeycomb core body comprises a multilayered spiral arrangement of said planar band and said corrugated band.

7. The device of claim 1, wherein said honeycomb core body comprises a laminated arrangement of said planar band and said corrugated band.

8. The device of claim 1, wherein said metal casing has a circular cross-section.

9. The device of claim 1, wherein said metal casing has an oval cross-section.

* * * * *